United States Patent [19]

Uecker et al.

[11] Patent Number: 4,662,597
[45] Date of Patent: May 5, 1987

[54] SUSPENSION FOR VEHICLE SEAT

[75] Inventors: Ronald T. Uecker, Milwaukee; John R. Schultz, West Bend, both of Wis.

[73] Assignee: Milsco Manufacturing Company, Milwaukee, Wis.

[21] Appl. No.: 781,302

[22] Filed: Sep. 26, 1985

Related U.S. Application Data

[63] Continuation-in-part of Ser. No. 661,263, Oct. 15, 1984, abandoned, which is a continuation of Ser. No. 384,035, Jun. 1, 1982, abandoned.

[51] Int. Cl.$^4$ .............. F16M 13/00; B60G 21/00; A47C 7/14; B60N 1/02
[52] U.S. Cl. .................. 248/564; 248/419; 267/11 R; 267/131; 267/170; 297/307
[58] Field of Search ............. 267/8 B, 11 R, 66, 68, 267/69, 70, 131, 132, 133, 170, 173, 174, 175, 177, 178, 179; 248/419, 421, 564, 567; 297/307, 308

[56] References Cited

U.S. PATENT DOCUMENTS

| 2,560,688 | 7/1951 | Dorton | 248/419 |
| 2,606,592 | 8/1952 | McIntyre | 297/308 |
| 2,629,427 | 2/1953 | McIntyre | 248/567 |
| 2,841,996 | 7/1958 | Jamieson et al. | 248/419 |
| 3,291,525 | 12/1966 | Fritzmeier | 297/308 |
| 3,480,324 | 11/1969 | Bauer et al. | 297/308 |
| 3,572,828 | 3/1971 | Lehner | 248/567 |
| 4,033,542 | 7/1977 | Moehle et al. | 248/567 |
| 4,186,963 | 2/1980 | Koutsky | 297/308 |

FOREIGN PATENT DOCUMENTS

| 458617 | 8/1949 | Canada | 297/308 |
| 929542 | 12/1947 | France | 267/170 |

Primary Examiner—Andres Kashnikow
Assistant Examiner—Robert J. Oberleitner
Attorney, Agent, or Firm—James E. Nilles; Thomas F. Kirby

[57] ABSTRACT

A seat suspension for resiliently attaching a seat assembly to a support frame on a vehicle so as to cushion the ride for the seat occupant comprises: main biasing springs operatively connected between the seat assembly and support frame to initially absorb energy and limit descent as the seat assembly is forced downward; auxiliary biasing springs, including a "hard" spring and a "soft" spring, to subsequently absorb energy and further limit descent after the main springs have been compressed a predetermined amount; and a shock absorber connected between the seat assembly and support frame to dampen vertical motion. A preloading apparatus is provided for adjusting or preloading the main biasing springs to take into account the weight of the seat occupant. A height adjusting apparatus is provided to adjust the height of the seat assembly and associated biasing springs relative to the support frame. A positioning apparatus is provided to enable the support frame to be shifted fore and aft relative to the vehicle.

16 Claims, 13 Drawing Figures

SUSPENSION FOR VEHICLE SEAT

This application is a continuation-in-part of application Ser. No. 661,263, filed Oct. 15, 1984 now abandoned, which, in turn, is a continuation of Ser. No. 384,035, filed June 1, 1982 and now abandoned.

BACKGROUND OF THE INVENTION

1. Field of Use

This invention relates generally to suspension means for a vehicle seat, such as a tractor seat or the like, to cushion the ride for the seat occupant by damping vertical motion of the seat and absorbing shocks as the vehicle travels over rough terrain.

2. Description of the Prior Art

Various types of suspension means for resiliently supporting a vehicle seat on some portion of the vehicle, such as the vehicle frame, are known and in use to enable the vehicle seat to move relative to the vehicle frame and thereby cushion the ride for the seat occupant. Prior art seat suspension means or mechanisms typically comprise one or more heavy duty compression springs and other related components which are mounted between the vehicle seat and the vehicle frame and are located directly beneath the seat. Such an arrangement wherein the springs and related components are located beneath the seat prevent the seat from being adjustably positioned as near to the vehicle floor as may sometimes be required to suit the needs of the seat occupant. Furthermore, in some prior art arrangements a severe jolt may cause the seat to descent so far that it runs out of spring travel and comes to an abrupt and jolting stop. Heretofore, it was necessary to mount a resilient block made of rubber or the like beneath the seat and against which the seat could bounce when there was no more spring travel available to cushion the descent. U.S. Pat. No. 4,186,963 to Koutsky entitled "Upright Vehicle Seat Support" discloses supports, for vehicle seats, having a generally upright configuration and having a plurality of seat adjustments. A housing member (13) has facing traces (17), and a carriage member (14) bears the seat and a plurality of rollers (51, 53) which engage the traces (17). A bracket assembly (15), disposed between housing and carriage members (13, 14), is selectively slidable with respect to the carriage member (14) to effect height adjustment and, when locked with respect to the carriage member (14), is operable to effect weight adjustment.

French Pat. No. 929,542 to Rometti discloses springs of different sized serially arranged in a cylinder and upon which a piston acts to effect compressibility, with the smaller springs appearing to compress before the larger springs.

SUMMARY OF THE INVENTION

In accordance with the invention a vehicle, such as a tractor, is provided with attachment means for adjustably securing to the vehicle a rigid support frame on which are mounted a seat assembly and a seat suspension means for the seat assembly. The support frame comprises a back plate and laterally spaced apart side plates and is vertically stationary relative to the vehicle.

The seat assembly comprises a seat portion and a back rest portion. The seat assembly is mounted for vertical resilient movement downwardly and upwardly on the support frame by means of the seat suspension means so as to cushion the ride for the seat occupant. The seat suspension means generally comprises a spring support assembly including a vertically movable upper spring support plate connected to the backrest portion of the seat and a stationary (but adjustably positionable) lower spring support plate; at least one coiled compression type main biasing spring mounted between the two support plates; a pair of vertically spaced apart coiled compression type auxiliary springs, including a "soft" upper spring and a "hard" lower spring, mounted between the two spring support plates on a threaded spring tension adjustment or preloading rod; a tie rod assembly pivotally connected between the support frame and the seat portion of the seat assembly; and a shock absorber connected between the upper spring support plate and the tie rod assembly.

The main biasing spring is operatively connected between the seat assembly and the support frame to initially absorb energy and limit descent as the seat assembly is forced downward. The auxiliary biasing springs, including the "hard" spring and the "soft" spring, come into play to subsequently absorb energy and further limit descent after the main biasing spring has been compressed a predetermined amount. The shock absorber connected between the seat assembly and the support frame operates to dampen vertical motion.

A preloading apparatus is provided for adjusting or preloading the main biasing spring to take into account the weight of the seat occupant. A height adjusting apparatus is provided to adjust the height of the support frame and the seat assembly and associated biasing springs relative to a support member. The aforesaid attachment means comprises positioning apparatus to enable the support member to be shifted fore and aft relative to the vehicle.

A seat suspension means in accordance with the present invention offers several advantages over the prior art. For example, since the suspension means is located behind the seat assembly rather than beneath it, as is the case in most prior art suspension systems, the seat assembly is able to be shifted between its maximum raised position and a minimum lowered position, which lowered position is extremely close to the vehicle on which the seat assembly is mounted. This results in a more compact overall structure without sacrificing a maximum range of seat adjustments. In addition the suspension means in accordance with the invention eliminates "bottoming-out" of the seat assembly when the vehicle is subjected to intense road or terrain shocks. Since the main springs come into play before the auxiliary springs, there will be many instances wherein the shock is relatively minor and the main springs are sufficient to absorb the energy. When more severe shocks are encountered however, the auxiliary springs come into play and the "soft" spring is available to handle any additional shock. If necessary, the "hard" spring is available to handle any additional shock. The associated shock absorber dampens and makes smooth upward and downward movements of the seat assembly. The main springs can be preloaded to take into account seat occupants of different weights by means of a simple rotatable handle. Means are provided to give the person making the preloading adjustment a visual indication of the preload setting. Thus experience will indicate to different machine operators and seat occupants what preload setting is best for them. In one embodiment of the invention means are provided to raise and lower the support frame and the seat assembly and the associated seat suspension relative to the supporting member and vehicle floor. The suspension means are compact and do not take up any excess space in or on the vehicle. Furthermore the suspension means are relatively simple and straightforward in construction and reliable in use, even though they enable a wide range of individual adjustments. Means are provided to enable fore and aft positioning of the support member and the components mounted thereon. This mode of action is not found in the aforementioned patents of Koutsky and Rometti, alone or in combination. In Koutsky, there are two main suspension springs and a pair of helper springs; the latter operating to move the carriage upwardly after the human operator leaves seat. However, there is no teaching ih Koutsky that the helper springs become loaded after the main springs are first loaded by some predetermined amount. Apparently, Koutsky's main springs and helper springs either load concurrently or the helper springs load first. Furthermore, Koutsky does not disclose that the helper springs include a hard spring and a soft spring which are compressible at different rates. In addition, neither Koutsky nor Rometti suggest that the complex springs of Rometti should replace the helper springs of Koutsky or what effect would result if this were done. In Koutsky the helper springs are not dynamically active in the suspension action. The length of the helper springs does not change when the operator encounters rough terrain. The purpose of the helper springs is only to serve as an adjunct for the height adjust mechanism. When the operator releases the height adjust latch, the helper springs act to bias the weight of the seat upward so that the operator does not have to lift the weight of the seat in order to adjust its height. The auxiliary springs (hard and soft) in the present invention are used in the suspension action of the assembly and have no association with height adjustment. Other objects and advantages of the invention will hereinafter appear.

DESCRIPTION OF PREFERRED EMBODIMENTS

Figure 1:
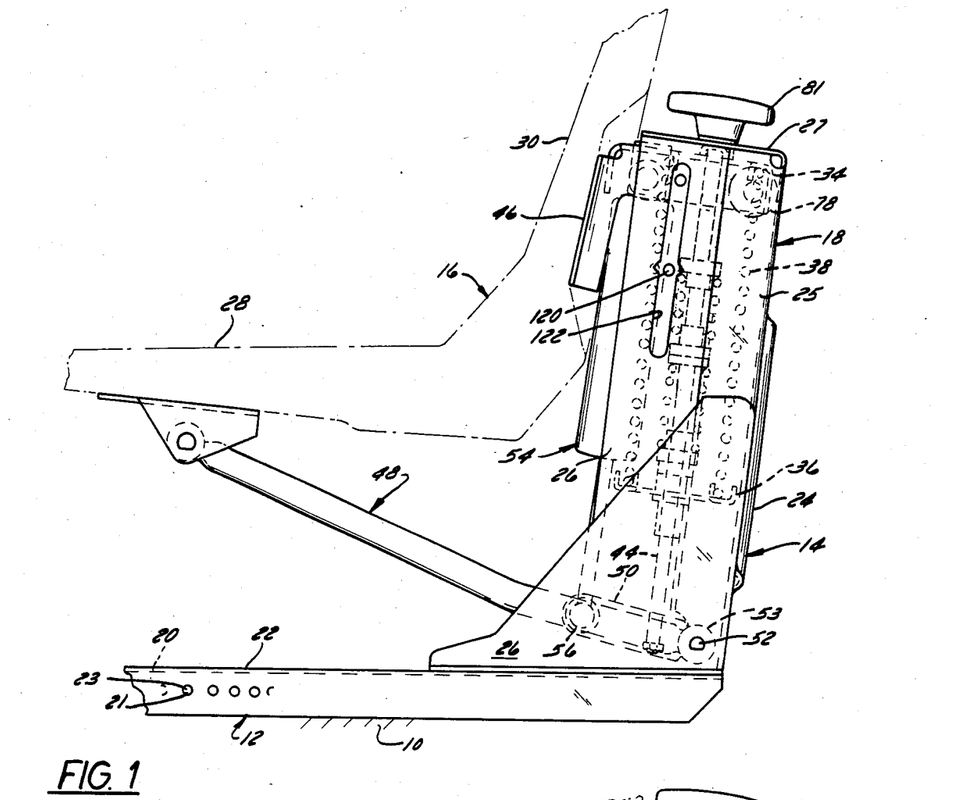
FIG. 1 is a side elevation view of a vehicle seat suspension assembly in accordance with the invention and showing it in its maximum weight adjust and unload position.
Figure 2:
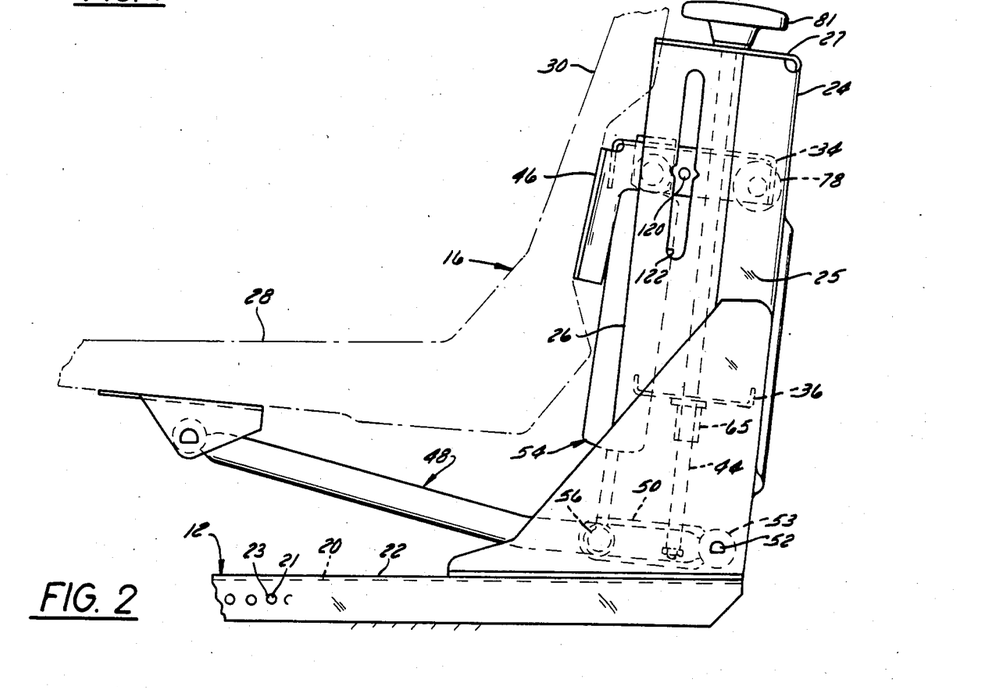
FIG. 2 is a view similar to FIG. 1 but showing the suspension assembly in its maximum weight adjust but loaded position.

Referring to FIG. 1, the numeral 10 designates a portion of a vehicle, such as a tractor, on which a seat assembly 16, including a sheet metal seat portion 28 and a sheet metal backrest portion 30, is mounted. Seat assembly 16 is resiliently connected for up and down vertical movement by a seat suspension means 18 to a rigid support frame 14 which is connected by an attachment means 12 to the tractor portion 10. Support frame 14 is fabricated of sheet metal and comprises a backplate 24, and a pair of laterally spaced apart side plates 26. Back plate 24 is bent or formed along its side edges to provide guide rails 25 for guide rollers 78 hereinafter described and bent or formed along its top edge to provide a top plate 27. The attachment means 12 enable support frame 14 to be shifted forward or rearward on the vehicle and includes, for example, a pair of laterally spaced apart rails 20 (one shown) on the vehicle which are slidably engaged with a pair of laterally spaced apart rails 22 (one shown) on the support frame 14 and a removable locking pin 21 engageable with holes such as 23 in the rails 20, 22 to releasably connect the rails in some desired position. Means 12 could be on a swivel structure (not shown).

As previously stated, seat assembly 16 comprises a seat portion 28 and a backrest portion 30 and is mounted for vertical resilient movement downwardly (FIG. 8) and upwardly (FIG. 7) on the support frame 14 by means of the seat suspension means 18 so as to cushion the ride for the seat occupant. The seat suspension means 18 generally comprises a spring support assembly 32 including a vertically movable upper spring support plate 34 connected to the backrest portion 30 of the seat assembly 16 by bent or formed brackets 46 and a stationary (but adjustably positionable) lower spring support plate 36; a pair of coiled compression type main biasing springs 38 mounted between the two support plates 34 and 36; a pair of vertically spaced apart coiled compression type auxiliary springs, including a "soft" or more easily deflected upper spring 40 and a "hard" or less easily deflected lower spring 42, mounted between the two spring support plates 34 and 36 on a threaded spring tension adjustment or preloading rod 44; a tie rod assembly 48 pivotally connected between the support frame 14 and the seat portion 28 of the seat assembly 16 and comprising a pivot link 50 and a pivot rod 52; and a shock absorber 54 connected between the upper spring support plate 34 and a pivot pin 56 supported by link 50 in the tie rod assembly 48 to dampen vertical motion.

The main biasing springs 38 are operatively connected between the seat assembly 16 and the support frame 14 to initially absorb energy and limit descent as the seat assembly 16 is forced downward. The auxiliary biasing springs, including the "soft" spring 40 and the "hard" spring 42, come into play to subsequently absorb energy and further limit descent after the main biasing springs 38 have been compressed a predetermined amount.

Figure 3:
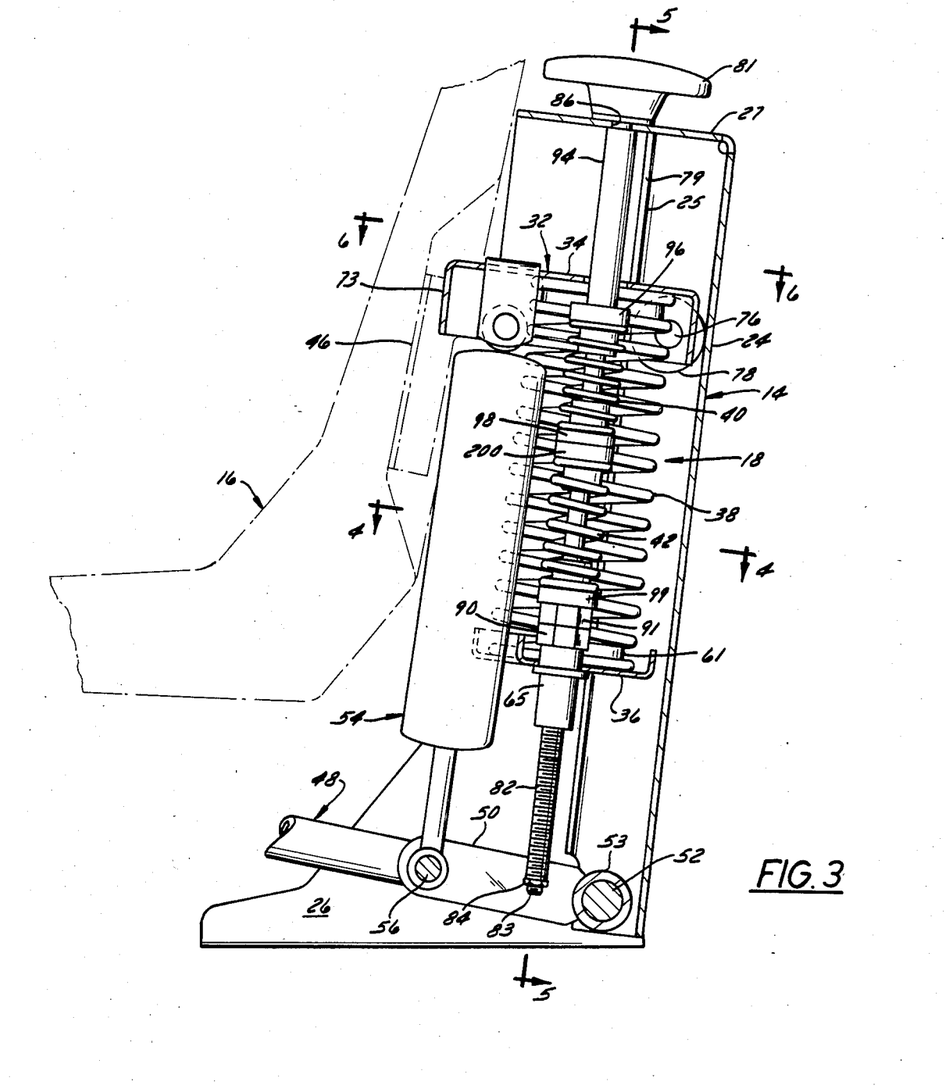
FIG. 3 is an enlarged vertical cross-section view of the suspension assembly.
Figure 4:
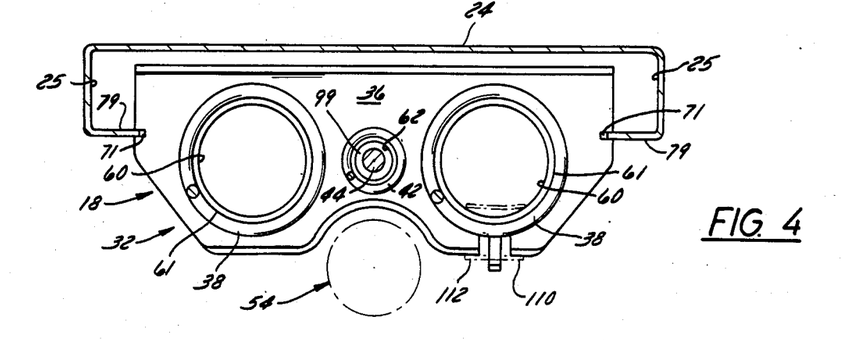
FIG. 4 is a cross-section view taken on line 4—4 of FIG. 3.
Figure 5:
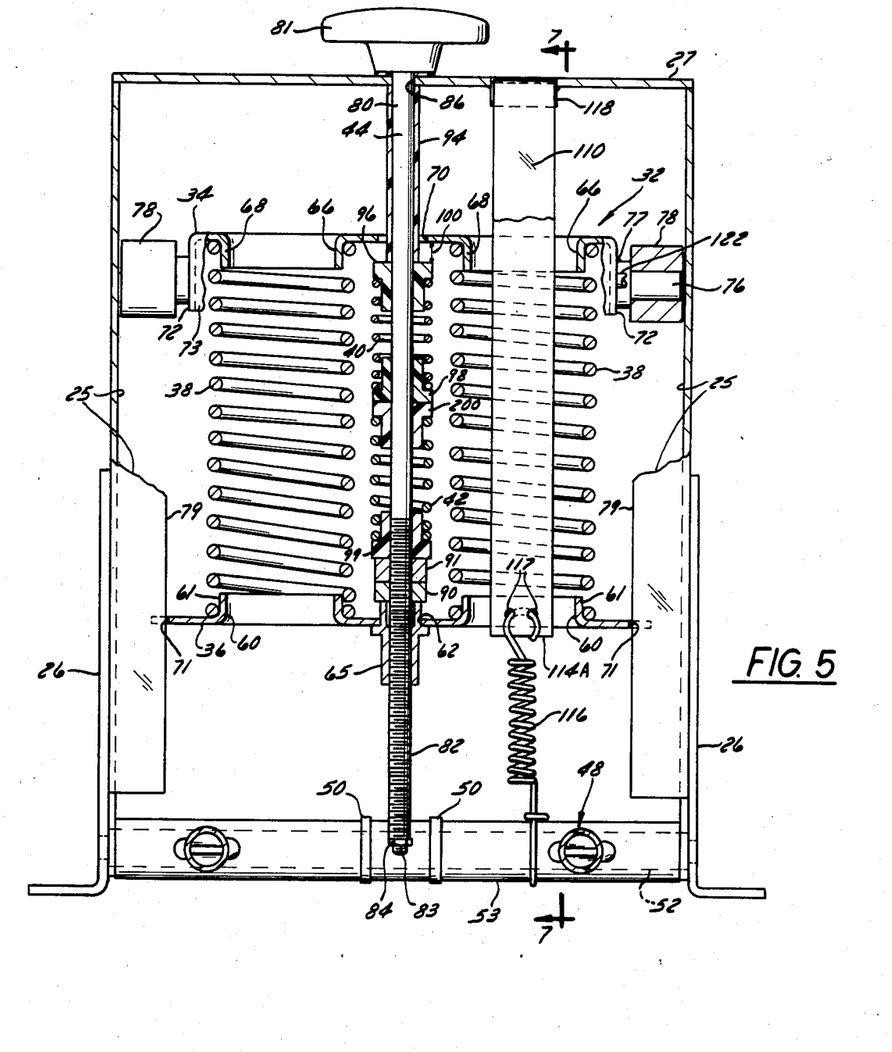
FIG. 5 is a cross-section view taken on line 5—5 of FIG. 3.
Figure 6:
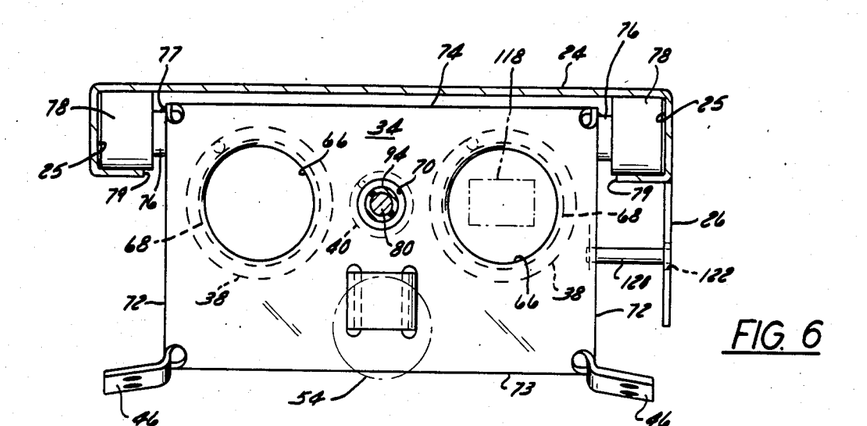
FIG. 6 is a cross-section view taken on line 6—6 of FIG. 3.

As FIGS. 3, 4 and 5 show, the lower spring support plate 36 is a rigid steel plate formed by punching or stamping to include two large holes 60, each surrounded by an upwardly extending spring-engaging flange 61, and to include a small central hole 62 in which an internally threaded rod-receiving bushing 65 is secured as by swaging 65 into 36. As FIGS. 3, 5 and 6 show, the upper spring support plate 34 is a rigid steel plate formed by punching or stamping to include two large holes 66, each surrounded by a downwardly extending spring-engaging flange 68, to include a small central hole 70, and to include downwardly depending side flanges 72 and front and rear flanges 73 and 74, respectively. Each main biasing spring 38 is disposed between the plates 34 and 36 and engages a flange 61 and a flange 68. Each side flange 72 of plate 34 carries a pin or axle 76 which is rigidly secured thereto by welding as at 77 and on which a guide roller 78 is rotatably mounted. The rollers 78 roll against the inner surface of backplate 24 of support frame 14 to guide the upper plate 34 during its vertical travel and also transfer a portion of the weight of the seat occupant from seat backrest portion 30 to the frame 14. Guide slots 71 in lower plate 36 slidably engage the flanged edges 79 of backplate 24.

The preloading rod 44 hereinbefore referred to and shown in FIGS. 3, 4, 5 and 6 serves the two-fold purpose of mechanically supporting and locating the auxiliary springs 40 and 42 and of enabling adjusting or preloading the main biasing springs 38, to take into account the weight of the seat occupant. Rod 44 comprises a cylindrical shank 80 having a handle 81 rigidly secured to its upper end and having a threaded portion 82 along its lower end. Rod 44 also has a small threaded end portion 83 which receives a nut 84 to prevent unlimited rotation and accidental disconnection of the rod during use. The shank 80 of rod 44 extends through a hole 86 in top plate 27 of seat support frame 14 and through the hole 70 in upper spring support plate 34 and the threaded portion 82 of the rod makes threaded engagement with the bushing 65 secured to lower spring support plate 36. A pair of nuts 90 and 91 are threaded on to threaded portion 82 or rod 44 in locking relationship relative to each other and are positioned during factory assembly at a predetermined location to achieve proper spacing of various components on the rod. A spacer sleeve 94 is located on the upper end of shank 80 of rod 44 and extends through hole 70 in top plate 34. The upper end of sleeve 94 bears against the underside of top wall 27 of support frame 14 and the lower end of sleeve 94 bears against the top side of an upper bushing 96 which is slidably mounted on shank 80. Intermediate bushing 98, intermediate bushing 200 and a lower bushing 99 are also slidably mounted on shank 80 of rod 44. The "soft" upper auxiliary spring 40 is disposed on shank 80 between the upper bushing 96 and intermediate bushing 98. The "hard" lower auxiliary spring 42 is disposed on shank 80 between intermediate bushing 200 and the lower bushing 99.

As FIG. 5 best shows, when the seat is occupied but not otherwise subjected to a shock load, a space 100 exists between the underside of upper spring support plate 34 and the upper side of the upper bushing 96. Thus, when plate 34 is subjected to a shock and starts to descend, it first causes the main springs 38 to compress but the auxiliary spring 40 does not start to compress until plate 34 traverses the space 100 and engages bushing 96.

In the arrangement shown in FIG. 5, the rod 44 cannot be rotated manually by means of handle 81 in the clockwise direction (as viewed in FIG. 6) because the nut 90 already bears against bushing 65, but rod 44 can be rotated counterclockwise (FIG. 6) and such rotation would cause plate 36 to move downward (as viewed in FIG. 5) to increase the spacing between the plates 34 and 36 and thus reduce the compression on the main springs 38.

FIG. 1 shows the seat assembly 16 in the maximum raised position relative to support frame 14 and it is to be understood that the seat assembly has no load thereon.

FIGS. 2, 3, 5 and 7 show the seat assembly 16 in the maximum raised position relative to support frame 14 when the seat assembly has a load thereon from the weight of a seat occupant (not shown).

Figures 7, 8:
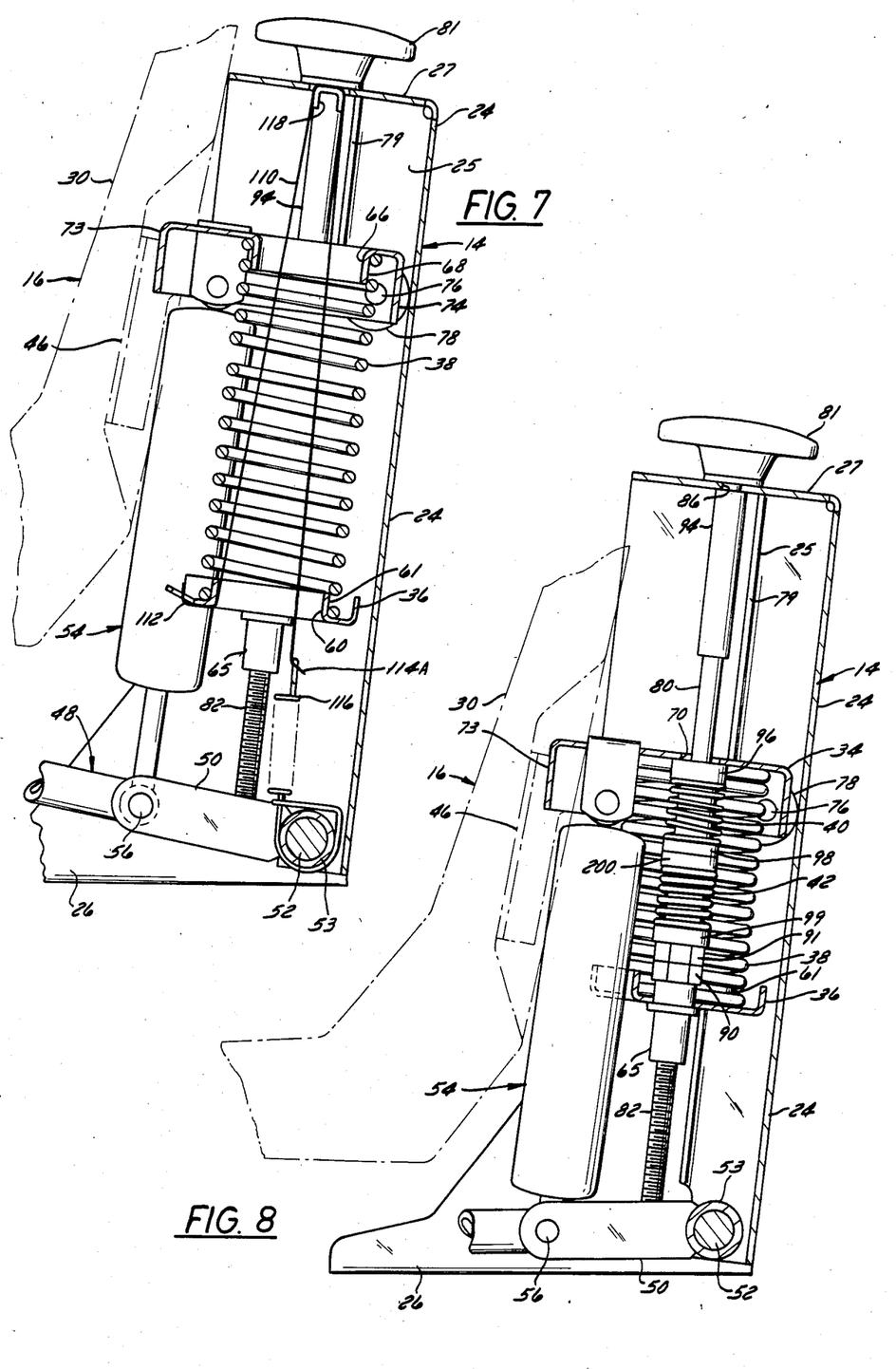
FIG. 7 is a cross-section view taken on line 7—7 of FIG. 5.
FIG. 8 is a view similar to FIG. 3 but showing the suspension asembly in fully loaded position.

FIG. 8 shows the assembly 16 in the maximum lowered position relative to support frame 14 when the seat assembly has a load thereon from the weight of a seat occupant (not shown) and has momentarily nearly bottomed out from a road shock.

As previously explained, load adjustment rod 44 can be manipulated to preload the main springs 38 to take into account the weight of the seat occupant. Means are also provided to give the person making the preloading adjustment a visual indication of the preload setting and, as FIGS. 3, 4, 5, 6 and 7 show, such means take the form of a flexible tape 110, made of metal, cloth or plastic, which has one end 112 anchored to lower spring support plate 36 and has its other end 114A connected to a coiled tension spring 116. The upper end of spring 116 engages a pair of holes 117 in tape 110 and the lower end of spring 116 is anchored to the sleeve 53. Tape 110 slides across a smooth bracket or tape support member 118 which is mounted on upper plate 27 as lower plate 36 is adjustably positioned by rod 44 and provides a visual reading (in pounds or kilograms, for example) of what weight setting has been selected with or without the operator seated on seat assembly 16. Calibration and positioning of the tape 110 are performed at the factory.

As FIGS. 1, 2, 5 and 6 show, upper plate 34 also carries a ride indicator pin 120 which is secured to a side flange 72 of upper plate 34 and extends through a slot 122 in a side plate 26 of support frame 14 to indicate the preferred position of upper plate 34 when the seat assembly 16 is occupied and rod 44 is adjusted to account for the weight of the occupant.

Figure 9:
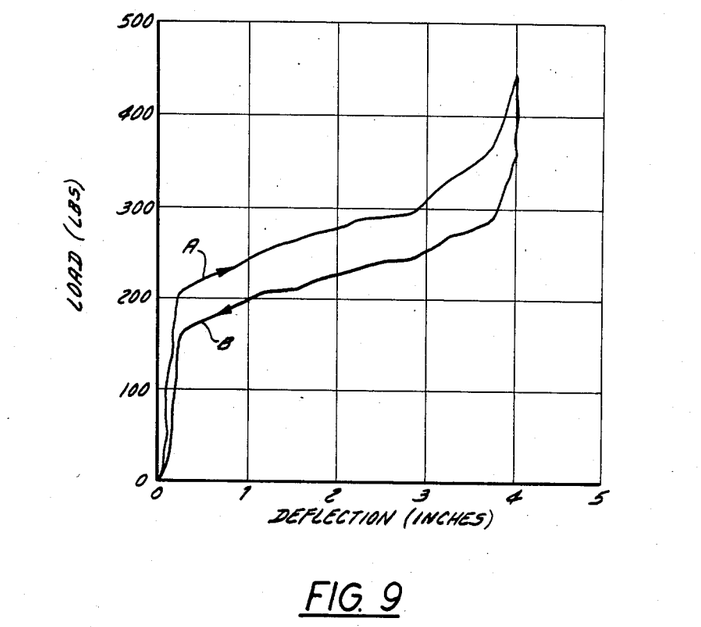
FIG. 9 is a graph wherein load and deflection are plotted for maximum weight adjustment.

The graph in FIG. 9, wherein the load in pounds on seat assembly 16 is plotted against deflection in inches of the seat assembly 16, shows a curve A indicative of down seat travel and a curve B indicative of up seat travel when maximum weight adjustment has been provided for.

Figure 10:
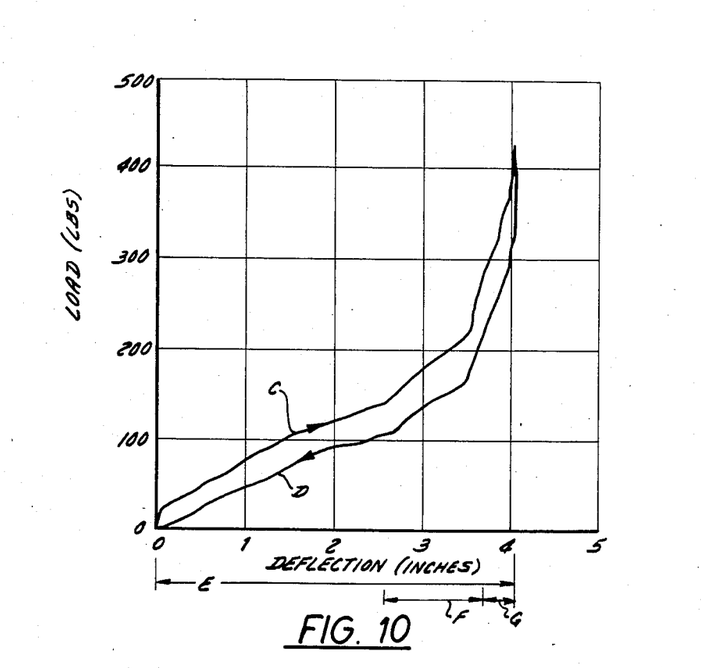
FIG. 10 is a graph wherein load and deflection are plotted for minimum weight adjustment.

The graph in FIG. 10, wherein the load in pounds on seat assembly 16 is plotted against deflection in inches of the seat assembly 16, shows a curve C indicative of down seat travel and a curve D indicative of up seat travel when minimum weight adjustment has been provided for. The graph in FIG. 10 also indicates regions designated E, F and G which signify the following:

E=compression of the main springs 38, 38;
F=pick up and start to compress auxiliary "soft" spring 40 and "hard" spring 42;
G=spring 40 fully compressed and continue to compress "hard" spring 42 and main springs 38, 38 still deflected.

It is to be noted that load adjustment by means of rod 44, affects only the main springs 38, which are set to the weight of the occupant.

Figure 11:
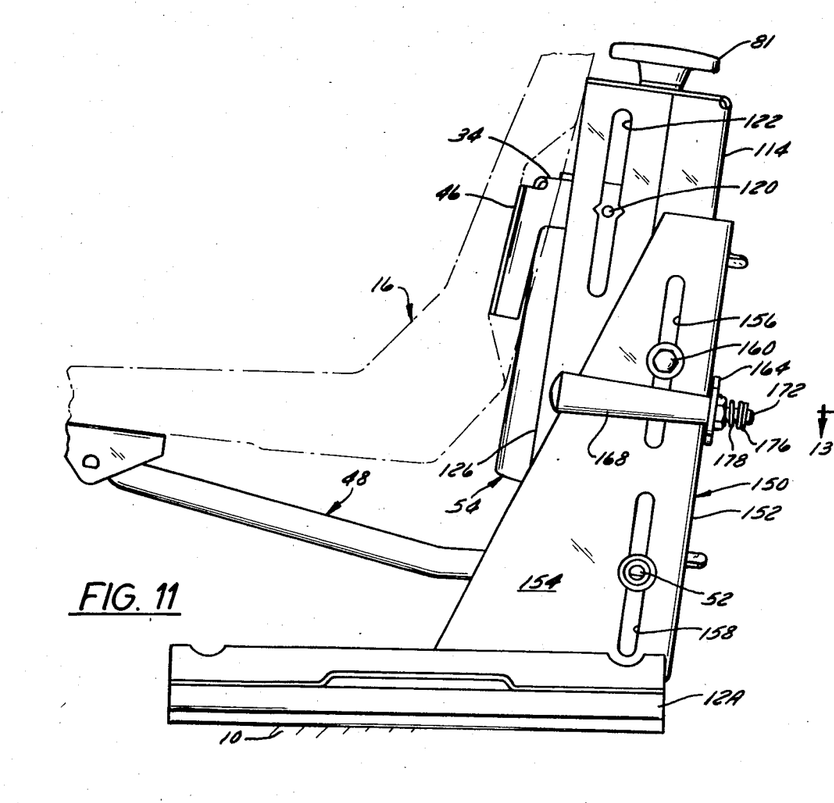
FIG. 11 is a side elevational view of the suspension assembly and showing a height adjustment assembly associated therewith.
Figure 12:
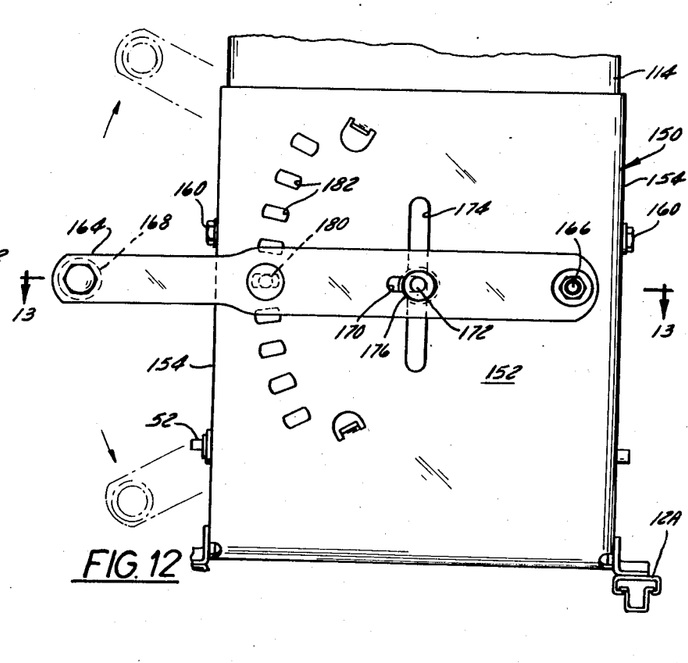
FIG. 12 is a rear elevational view of the height adjustment assembly of FIG. 11.
Figure 13:
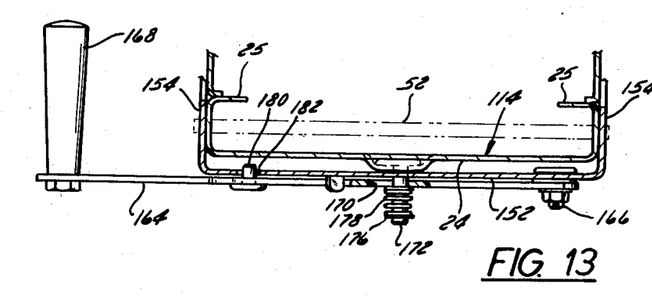
FIG. 13 is a view taken on line 13—13 of FIG. 12.

Referring to FIGS. 11, 12 and 13 there is shown another embodiment of the invention wherein height adjustment means are provided to adjust the height of a support frame 114, similar to support frame 14, on which the seat assembly 16 and the seat suspension means 18 are mounted relative to the vehicle 10. Such height adjustment means include a stationary support member 150 which is connected to vehicle 10 by attachment means 12A, similar to that hereinbefore described and which is adapted to adjustably support the support frame 14.

Stationary support member 150 comprises a back plate 152 and a pair of integrally formed laterally spaced apart side plates 154. Each side plate 154 of support member 150 is provided with an upper guide slot 156 and a lower guide slot 158 which slidably accommodate an upper bolt 160 and a pivot rod 52, respectively, which are secured to a side plate 126 of the support frame 114 and this arrangement enables support frame 114 to be slid or shifted vertically relative to stationary support member 150. The back plate 152 of support member 150 carries a lever 164 which is pivotally connected thereto at one end by a pivot pin or bolt 166 and which is provided with an operating handle 168 at its other end. The lever 164 is provided with horizontal slot 170 for accommodating a pin 172 which is rigidly secured as by welding to the back plate 24 of support frame 114 and extends therefrom through a vertical slot 174 in the back plate 152 of support member 150. Pin 172 has a washer 176 secured to its free end and a compression type coiled biasing spring 178 is disposed around pin 172 between the washer 176 and lever 164. Lever 164 is also provided with a positioning pin or detent 180 which is rigidly secured thereto and is releasably engageable with any one of a plurality of position holes 182 which are provided along an arc in the back plate 152 of support member 150.

Support frame 114 is shown located at an intermediate position on stationary support member 150 but can be moved to other upper and lower positions in the following manner, assuming that seat assembly 16 is unoccupied. First, handle 168 is grasped and lever 164 is swung against the bias of spring 178 so that detent 180 is clear of a hole 182. Then, lever 164 is swung up or down, as indicated by the arrows in FIG. 12, and this effects corresponding up or down movement of support framework 114 relative to support member 150. When a desired position is reached, detent 180 is allowed to engage an appropriate hole 182 and the framework 114 is locked in that position relative to support member 150. It is apparent from the foregoing description that the upper spring support member 30 is attached to the seat assembly 16 and is mounted for vertical movement on the support frame 114 between upper and lower positions. The lower spring support member is mounted on the support frame. The main biasing spring is mounted between the said members and is adapted to be loaded by the seat assembly as the latter descends from its upper position. The auxiliary biasing springs are mounted between the said members. The auxiliary biasing springs include one (soft) spring 40 which is deflected at a faster rate than the other (hard) spring 42. The springs 40 and 42 are connected in series with each other. The auxiliary springs are adapted to commence being loaded when the seat assembly 16 has descended a predetermined distance from its upper position and has already loaded said main biasing spring by a predetermined amount. Spring 40 is deflected at a faster rate or is more easily deflected to effect a difference in mode of operation between springs 40 and 42. These springs 40 and 42 start to compress or flex at the same moment but compression proceeds at different rates.

The sequence of applicants' spring action as the seat assembly 16 starts to descend is as follows:

1. The main spring 38 starts to compress (flex);
2. When the main spring 38 has compressed (flexed) a predetermined amount, then the auxiliary springs 40 and 42 start to compress (flex), while the main spring 38 continues to compress (flex); but soft spring 40 compresses at a faster rate than hard spring 42.
3. When the soft auxiliary spring 40 is fully compressed (flexed), the hard auxiliary spring 42 is only partially compressed (flexed); however, the main spring 38 continues to compress (flex) even further. The auxiliary springs are further adapted so that spring 40 becomes fully loaded before the other spring 42 becomes fully loaded and before said main biasing spring 38 becomes fully loaded.

We claim:

1. Seat suspension means for attaching a seat assembly to a support frame on a vehicle comprising:
    an upper spring support member attached to said seat assembly, said upper spring support member and said seat assembly being mounted for vertical movement relative to said support frame between upper and lower positions;
    a lower spring support member mounted on said support frame;
    a main biasing spring mounted between said members and adapted to be loaded by the seat assembly as the latter descends from its upper position;
    auxiliary biasing springs mounted between said members, said auxiliary biasing springs including one spring which is deflected at a faster rate than another spring, said auxiliary biasing springs adapted to commence being loaded by said seat assembly when the latter has descended a predetermined distance from its upper position and has already loaded said main biasing spring by a predetermined amount, said auxiliary biasing springs being further adapted so that said one spring becomes fully loaded before said another spring becomes fully loaded and before said main biasing spring becomes fully loaded;
    and shock absorber means connected between said upper spring support member and said support frame.

2. Seat suspension means according to claim 1 including a tie rod pivotably connected between said support frame and said seat assembly and through which said shock absorber means is connected to said support frame.

3. Seat suspension means according to claim 1 or 2 including means to preload said main biasing spring to compensate for the weight of a seat occupant.

4. Seat suspension means according to claim 3 including a support member for said support frame and means to adjust the height of said support frame relative to said support member to thereby adjust the height of said seat assembly relative to said vehicle.

5. Seat suspension means for attaching a seat assembly to a support frame on a vehicle comprising:
    an upper spring support member attachable to said seat assembly and mounted for vertical movement on said support frame between upper and lower positions;
    a lower spring support member;

mounting means for mounting said lower spring support member in a fixed position on said support frame;

a main biasing spring mounted between said members and adapted to be loaded by said upper spring support member as the latter descends in response to descent of said seat assembly;

auxiliary biasing springs mounted on said mounting means between said members, said auxiliary biasing springs including one spring which is deflected at a faster rate than another spring, said auxiliary biasing springs adapted to commence being loaded by said upper spring support member when the latter has descended a predetermined distance and has already loaded said main biasing spring by a predetermined amount;

a tie rod assembly pivotably connected between said support frame and said seat assembly;

and shock absorber means connected between said upper spring support member and said tie rod assembly.

6. Seat suspension means according to claim 5 wherein said mounting means comprise, an adjustment rod connected to said support frame and to said lower spring support member, said adjustment rod being operable to adjustably position said lower spring support member relative to said support frame to preload said main biasing spring to compensate for the weight of a seat occupant.

7. Seat suspension means according to claim 6 wherein said auxiliary biasing springs are coil springs which are mounted on said adjustment rod.

8. In combination:

a seat assembly;

a support frame for mounting on a vehicle;

and seat suspension means for resiliently attaching said seat assembly to said support frame to enable said seat assembly to move between upper and lower positions so as to cushion the ride for the seat occupant, said seat suspension means comprising: a main biasing spring operatively connected between said seat assembly and said support frame to flex and absorb energy and limit descent as said seat assembly is forced downward from said upper position for a predetermined distance; auxiliary biasing springs, including a "hard" spring and a "soft" spring, to flex and subsequently absorb energy and further limit descent after said main spring has been flexed a predetermined amount, said "soft" spring being adapted to flex at a faster rate than said "hard" spring so that said "soft" spring becomes fully flexed before said "hard" spring becomes fully flexed and before said main biasing spring becomes fully flexed; and a shock absorbed connected between said seat assembly and said support frame to dampen vertical motion.

9. A combination according to claim 8 including preloading means for preloading said main biasing spring to take into account the weight of the seat occupant.

10. A combination according to claim 8 or 9 including a support member for said support frame and height adjusting apparatus to adjust the height of said seat assembly and its associated support frame relative to said support member to thereby adjust the height of said seat assembly relative to said vehicle.

11. A combination according to claim 10 including positioning means to enable said support member to be shifted fore and aft relative to said vehicle.

12. In combination:

a seat assembly;

a support member for mounting on a vehicle;

a support frame mounted on said support member;

seat suspension means for resiliently attaching said seat assembly to said support frame so as to cushion the ride for the seat occupant, said seat suspension means comprising: a main biasing spring operatively connected between said seat assembly and said support frame to absorb energy and limit descent as said seat assembly is forced downward; auxiliary biasing springs, including a "hard" spring and a "soft" spring, to subsequently absorb energy and further limit descent after said main spring has been compressed a predetermined amount; and a shock absorbed connected between said seat assembly and said support frame to dampen vertical motion;

preloading apparatus for preloading said main biasing spring to take into account the weight of the seat occupant;

height adjusting apparatus to adjust the height of said seat assembly and its associated support frame relative to said support member to thereby adjust the height of said seat assembly relative to said vehicle;

said height adjusting apparatus including: an adjusting lever, means for pivotally mounting said lever at one end to said support member and near one side of the latter, said lever extending across said support member and having a handle at the other end thereof, a slot in said lever, a slot in said support member, a pin fixed to and extending from said support frame and extending through both slots, detent and hole means between said lever and support member, whereby swinging said lever about said means for pivotally mounting vertically adjusts said support frame and whereby said detent and hole means cooperatively engage to hold said support frame and said seat assembly in a vertically adjusted position relative to said support member, and positioning apparatus to enable said support member to be shifted fore and aft relative to said vehicle.

13. In combination:

a seat assembly;

a support member for mounting on a vehicle;

a support frame mounted on said support member;

seat suspension means for resiliently attaching said seat assembly to said support frame so as to cushion the ride for the seat occupant, said seat suspension means comprising: a main biasing spring operatively connected between said seat assembly and said support frame to absorb energy and limit descent as said seat assembly is forced downward; and a shock absorber connected between said seat assembly and said support frame to dampen vertical motion;

preloading apparatus for preloading said main biasing spring to take into account the weight of the seat occupant;

height adjusting apparatus to adjust the height of said seat assembly and its associated support frame relative to said support member to thereby adjust the height of said seat assembly relative to said vehicle;

said height adjusting apparatus including: an adjusting lever, means for pivotally mounting said lever at one end to said support member and near one side of the latter, said lever extending across said support member and having a handle at the other end thereof, a slot in said lever, a slot in said support member, a pin fixed to and extending from said support frame and extending through both slots, detent and hole means between said lever and support member, whereby swinging said lever about said means for pivotally mounting vertically adjusts said support frame and whereby said detent and hole means cooperatively engage to hold said support frame and said seat assembly in a vertically adjusted position relative to said support member;

and positioning apparatus to enable said support member to be shifted fore and aft relative to said vehicle.

14. Seat suspension means for attaching a vertically movable seat assembly to a support frame on a vehicle comprising:

an upper spring support member attached to said seat assembly and mounted for vertical movement on said support frame between upper and lower positions;

a lower spring support member mounted on said support frame;

a main biasing spring mounted between said members and adapted to be loaded by the seat assembly as the latter descends from its upper position;

auxiliary biasing springs mounted between said members, said auxiliary biasing springs including one spring which is deflected at a faster rate than another spring, said auxiliary biasing springs adapted to commence being loaded by said seat assembly when the latter has descended a predetermined distance from its upper position and has already loaded said main biasing spring by a predetermined amount, said auxiliary biasing springs being further adapted so that said one spring becomes fully loaded before said another spring becomes fully loaded and before said main biasing spring becomes fully loaded;

a tie rod pivotably connected between said frame and said seat assembly;

and shock absorber means connected between said upper spring support member and said tie rod.

15. Seat suspension means according to claim 14 including means to preload said main biasing spring to compensate for the weight of a seat occupant.

16. Seat suspension according to claim 15 including a support member for said support frame and means to adjust the height of said support frame relative to said support member to thereby adjust the height of said seat assembly relative to said vehicle.

* * * * *